United States Patent
Yoshida et al.

(10) Patent No.: US 8,034,729 B2
(45) Date of Patent: Oct. 11, 2011

(54) SUPPORT SUBSTRATE FOR SEPARATION MEMBRANE

(75) Inventors: Minoru Yoshida, Tokyo (JP); Ryuji Suzuka, Tokyo (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 0 days.

(21) Appl. No.: 11/793,377

(22) PCT Filed: Dec. 19, 2005

(86) PCT No.: PCT/JP2005/023290
§ 371 (c)(1), (2), (4) Date: Jun. 19, 2007

(87) PCT Pub. No.: WO2006/068100
PCT Pub. Date: Jun. 29, 2006

(65) Prior Publication Data
US 2008/0138596 A1   Jun. 12, 2008

(30) Foreign Application Priority Data
Dec. 21, 2004   (JP) .................................. 2004-369232

(51) Int. Cl.
*D04H 5/06*   (2006.01)
*D04H 1/54*   (2006.01)
*D04H 3/16*   (2006.01)
*B01D 69/10*  (2006.01)
*B29C 59/02*  (2006.01)

(52) U.S. Cl. ........ 442/345; 442/340; 442/415; 442/381; 442/382; 442/392; 264/175; 264/165

(58) Field of Classification Search ................. 442/382, 442/381, 392, 400, 401, 345, 340, 415; 264/175, 264/165
See application file for complete search history.

(56) References Cited

U.S. PATENT DOCUMENTS 7,441,667 B2 * 10/2008 Galvin et al. ................. 210/507
(Continued)

FOREIGN PATENT DOCUMENTS
EP   0 557 659 A2   9/1993
(Continued)

OTHER PUBLICATIONS

Supplementary European Search Report dated Jul. 2, 2008.
(Continued)

*Primary Examiner* — Cheryl Juska
(74) *Attorney, Agent, or Firm* — Finnegan, Henderson, Farabow, Garrett & Dunner, L.L.P.

(57) ABSTRACT

A separation membrane support substrate characterized by being composed of a laminated nonwoven fabric comprising a front layer as the resin coating layer, a middle layer and a back layer which are integrally formed by heat bonding, and by satisfying the following conditions (1) to (5): (1) The front layer has at least one layer comprising thermoplastic resin filaments with a single filament diameter of 7-30 μm; (2) the middle layer has at least one layer comprising melt blown fibers with a single fiber diameter of no greater than 5 μm, and a fiber basis weight of at least 1 g/m² and comprising no more than 30 wt % of the total fiber basis weight; (3) the back layer has at least one layer comprising thermoplastic resin filaments with a single filament diameter of 7-20 μm, and has a fiber basis weight of 3-40 g/m²; (4) the laminated nonwoven fabric has an apparent density of 0.67-0.91 g/cm³; and (5) the laminated nonwoven fabric has a thickness of 45-110 μm.

11 Claims, 1 Drawing Sheet

U.S. PATENT DOCUMENTS

2006/0292954 A1* 12/2006 Suzuka et al. ................ 442/345
2007/0138084 A1* 6/2007 Galvin et al. ................ 210/490

FOREIGN PATENT DOCUMENTS

| | | |
|---|---|---|
| JP | 2-289161 | 11/1990 |
| JP | 04-136249 | 5/1992 |
| JP | 5-179558 | 7/1993 |
| JP | 2952335 | 9/1999 |
| JP | 2004-243220 | 9/2004 |
| WO | WO 2004/094136 | 11/2004 |

OTHER PUBLICATIONS

Office Action for Related Application No. JP 2006-548979 dated Jan. 12, 2010.

* cited by examiner

SUPPORT SUBSTRATE FOR SEPARATION MEMBRANE

TECHNICAL FIELD

The present invention relates to a support substrate for a separation membrane such as an ultrafiltration membrane or reverse osmosis membrane.

BACKGROUND ART

Filters used for ultrafiltration and reverse osmosis include spiral types wherein a flat separation membrane is coiled in spiral fashion, types wherein a plurality of hollow fiber separation membranes are arranged in parallel and tubular types wherein a flat separation membrane is worked into a cylindrical shape, and all such types can be held in a cartridge with a fixed volume for use.

Among such separation membranes, the flat separation membranes are produced as sheets by coating a resin with a separating function onto a support substrate such as a nonwoven fabric. The nonwoven fabric used as the support substrate functions as a coating base for production of a uniform film when the separation membrane is produced, while also performing the basic function of strength maintenance to prevent rupture of the separation membrane due to the pressure of the filtration medium during use. Therefore, a staple fiber wet laid nonwoven fabric is used which can provide a high degree of uniformity.

In recent years, as such separation membranes have become more widely used, an improvement in treatment efficiency, per cartridge, has also become an important issue. Thinner separation membranes including support substrates have therefore been desired, in order to maximize the number of separation membranes that can be placed in each cartridge and lower the pressure loss of the separation membranes for an increased flow volume.

In order to achieve thin, uniform coating films, the support substrate itself must be reduced in thickness while maintaining surface smoothness and strength. However, when the amount of fiber is reduced to form a thinner support substrate, the problem of "strike-through" can occur whereby the resin seeps out from the back of the support substrate during coating. The resin escaping from the back side of the support substrate contaminates the film-forming apparatus and can cause defects in a continuously formed separation membrane.

Also, although reducing the amount of fiber to form a thinner support substrate increases the liquid permeability, it also results in noticeable thickness spots in the support substrate and more sections susceptible to "strike-through". Another serious problem is reduced strength and, particularly in the case of a staple fiber wet laid nonwoven fabric, reducing the amount of fiber results in a drastic reduction in strength. Methods exist for increasing the apparent density to achieve thinner size but, as the fiber diameter (D) and fiber length (L) must have a ratio (L/D) within a specified range in order to achieve a uniform dispersion to avoid tangling of the fibers in the wet laid stock solution, the fiber length must be shortened, thereby drastically reducing the strength of the nonwoven fabric.

In Japanese Unexamined Patent Publication No. 2002-095937 and U.S. Pat. No. 6,156,680 there are proposed methods of using low-crystalline polyethylene terephthalate staple fibers and methods of combining low-melting-point fibers for the purpose of increasing a heat bonding strength. However, for the reasons explained above, the strength is significantly low when the fiber diameter is 4.5 μm or smaller and, therefore, it has not been possible to sufficiently achieve a thinner size while preventing strike-through.

US2005-6301 describes a method of mixing staple fibers with different fiber lengths, but it is not possible to obtain a thin support substrate having sufficiently high strength while preventing strike-through.

Japanese Unexamined Patent Publication SHO No. 60-238103 proposes using a nonwoven fabric with a loose-dense bilayer structure prepared by a wet laid method, in order to better prevent strike-through of the coating resin. The loose-dense bilayer structure comprises a loose layer with a fiber diameter of 17-54 μm and a fiber length of 3-50 mm on the resin coating side and a dense layer with a fiber diameter of 2.7-17 μm and a fiber length of 3-50 mm on the back side.

However, a dense layer composed of thin fibers has a high L/D ratio and therefore the fibers tend to tangle together during wet laid, and the obtained nonwoven fabric is susceptible to defects such as projections. When the fiber lengths are shortened to reduce tangling between the fibers, the strength tends to be reduced.

The aforementioned Japanese Unexamined Patent Application No. 60-238103 therefore proposes a loose-dense-loose trilayer structure wherein a thick fiber layer is further situated on the back of the dense layer in order to guarantee strength. However, the obtained support substrate cannot be satisfactory because of increased thickness.

Japanese Unexamined Patent Publication SHO No. 61-222506 describes lamination of a nonwoven fabric formed by a staple fiber dry method and a melt blown nonwoven fabric, followed by heat bonding to form a loose-dense structure. Even by this method, however, the problem of unevenness is not eliminated in the staple fiber dry method. In addition, as a melt blown nonwoven fabric or ultrafine fiber wet laid nonwoven fabric has very low tensile strength and surface abrasive strength, for example, a fiber volume of 70 g/m$^2$ or greater must be used in the case of ultrafine fibers, while a fiber volume of 100 g/m$^2$ is necessary with a dry method nonwoven fabric. Consequently, the thickness of the support substrate is increased and a thin support substrate cannot be satisfactorily achieved.

Japanese Unexamined Patent Publication No. 2003-245530 proposes a separation membrane with improved strike-through prevention by providing gaps as the loose structure in the non-coating side, and using a thin nonwoven fabric with a thickness of no greater than 80 μm as the support substrate. The support substrate requires a large amount of resin for filling of the gaps in the loose layer when the coating resin penetrates from the dense layer to the loose layer, and the consequent effect of reduced penetration rate in the direction of thickness is utilized.

The aforementioned Japanese Unexamined Patent Publication No. 2003-245530 mentions staple fiber wet laid nonwoven fabrics with two different structures as examples of loose-dense structures. One of these is a nonwoven fabric having a structure produced using a calender with a temperature differential, for formation of a highly dense coating side with high adhesive strength by high-temperature bonding, and a low-density non-coating side having a uniform structure in the plane direction by low-temperature bonding, while the other is a nonwoven fabric having a structure which is irregular in the plane direction or periodically irregular, by forming hills and valleys on the non-coating side by emboss bonding.

However, problems with nonwoven fabrics having the former structure include weak bonding conditions in 50 wt % or more of the fibers, and wrinkles during the separation membrane production process due to a lack of strength or low rigidity. Because of weak bonding on the coating side, fluffing tends to occur upon contact with the guide roll in the resin coating step, leading to poor stability during resin coating.

A problem with nonwoven fabrics having the latter structure is that the valleys having high fiber density are resistant to penetration and the coating resin preferentially penetrates into the hills, such that the coating resin reaches the tops of the hills before penetrating to the valleys, therefore resulting in a non-uniform coating.

In order to avoid these problems, some supports are produced by lamination with perforated nonwoven fabrics or nonwoven fabrics with hill-valley forms produced by a separate step such as corrugation, but in such cases the hills and valleys cause thickness spots in the resin coating layer, resulting in reduced stability of the membrane performance. The thickness spots in the resin coating layer are also produced by emboss bonding, and are more notably produced with thinner nonwoven fabrics.

WO2004-94136 filed by the present inventors describes a support substrate composed of three layers: a thermoplastic filament nonwoven fabric, a melt blown nonwoven fabric and a thermoplastic filament nonwoven fabric, but the method of using the support substrate is not described in detail.

DISCLOSURE OF THE INVENTION

Problems to be Solved by the Invention

It is an object of the invention to solve the aforementioned problems of the prior art by providing a separation membrane support substrate composed of a laminated nonwoven fabric with practical strength, which is thin and exhibits excellent strike-through prevention and integration with coating resins.

Means for Solving the Problems

As a result of much diligent research on the aforementioned problems, the present inventors have achieved the present invention after discovering that it is possible to obtain a laminated nonwoven fabric with high strength and excellent strike-through prevention which is suitable for resin coating, by using thermoplastic resin filament nonwoven fabrics, which were considered difficult to use in the prior art because of poor uniformity, as the top and bottom layers, situating between them a small amount of melt blown fibers having a fiber diameter of no greater than 5 μm, and performing lamination, to a specified apparent density to form a composite, by heat bonding.

The present invention is as follows.

1. A separation membrane support substrate characterized by being composed of a laminated nonwoven fabric comprising a front layer as the resin coating layer, a middle layer and a back layer which are integrally formed by heat bonding, and by satisfying the following conditions (1) to (5).

(1) The front layer has at least one layer comprising thermoplastic resin filaments with a single filament diameter of 7-30 μm.

(2) The middle layer has at least one layer comprising melt blown fibers with a single fiber diameter of no greater than 5 μm, and a fiber basis weight of at least 1 g/m² and comprising no more than 30 wt % of the total fiber basis weight.

(3) The back layer has at least one layer comprising thermoplastic resin filaments with a single filament diameter of 7-20 μm, and has a fiber basis weight of 3-40 g/m².

(4) The laminated nonwoven fabric has an apparent density of 0.67-0.91 g/cm³.

(5) The laminated nonwoven fabric has a thickness of 45-110 μm.

2. A separation membrane support substrate according to 1. above, characterized in that the smoothness of the coating layer surface is 0.2-2 μm in terms of the KES surface roughness SMD.

3. A separation membrane support substrate according to 1. or 2. above, characterized in that the filament diameter of the thermoplastic resin filaments used in the front layer is 7-20 μm.

4. A separation membrane support substrate according to any one of 1. to 3. above, characterized in that the fiber diameter of the melt blown fibers is 1-3 μm.

5. A separation membrane support substrate according to any one of 1. to 4. above, characterized in that the melting point of the thermoplastic resin filaments and the melt blown fibers is 180° C. or higher.

6. A separation membrane support substrate according to any one of 1. to 5. above, characterized in that the main component of the thermoplastic resin filaments and/or melt blown fibers is a polyester fiber or polyester copolymer fiber, or a polyester and polyester copolymer blend fiber.

7. A separation membrane support substrate according to 6. above, characterized in that the melt blown fibers comprise polyethylene terephthalate (hereinafter abbreviated as PET) with a solution viscosity ($\eta$sp/c) of 0.2-0.8.

8. A separation membrane support substrate according to any one of 1. to 7. above, characterized in that the laminated nonwoven fabric is subjected to calender treatment after integral formation by heat bonding.

9. A process for production of a separation membrane support substrate, characterized by satisfying the following conditions (a) to (d).

(a) a thermoplastic resin filament is spun on a conveyor using a thermoplastic resin with a melting point of 180° C. or higher to form at least one nonwoven fabric layer, (b) at least one layer of fibers with a crystallinity of 15-40% and a fiber diameter of no greater than 5 μm, composed of a thermoplastic resin with a melting point of 180° C. or higher, is laminated thereover by a melt blow method, (c) at least one layer of a nonwoven fabric of thermoplastic resin filaments composed of a thermoplastic resin with a melting point of 180° C. or higher is further laminated, and (d) a flat roll is used for heat bonding at a temperature of 50-120° C. below the melting point of the thermoplastic resin filaments, at a line pressure of 100-1000 N/cm, after which calender treatment is carried out at a temperature of at least 10° C. higher than the aforementioned heat bonding temperature and 10-100° C. lower than the melting point of the thermoplastic resin filaments, at a line pressure of 100-1000 N/cm.

10. A process for production of a separation membrane support substrate according to 9. above, characterized in that the thermoplastic resin is a polyester-based resin.

The present invention will now be explained in greater detail.

The separation membrane support substrate of the invention is composed of a laminated nonwoven fabric wherein a small amount of melt blown fibers (middle layer) are laminated and heat bonded between thermoplastic resin filament nonwoven fabrics as the front layer and back layer. In a laminated nonwoven fabric having this structure, the apparent density is set within a specific range in order to achieve the opposing properties of adhesion with coating resins and strike-through prevention, thereby allowing high strength to be achieved, even with thin nonwoven fabrics with low amounts of fibers.

That is, the first feature of the present invention is that the support substrate is made of a nonwoven fabric composed mainly of thermoplastic resin filaments.

It is necessary to shorten the fiber lengths in order to obtain a thin staple fiber wet laid nonwoven fabric using thin fibers and, as fewer bonding points result per single filament, the strength of the nonwoven fabric is reduced. Consequently, in order to obtain sufficient strength to withstand the resin coating step it has been necessary for the fiber diameter to be 16 μm or greater.

On the other hand, as a thermoplastic resin filament nonwoven fabric has virtually no strength reduction due to thinned fibers, it has been possible to obtain sufficiently high strength even with a filament diameter of 7-20 μm. Furthermore, whereas the strength is drastically reduced when using a small amount of fibers in a staple-fiber nonwoven fabric, in a thermoplastic resin filament nonwoven fabric the strength is only reduced by the degree of reduction in fiber amount, and therefore high strength can be realized even with a low fiber amount.

As filaments are used for the coating layer according to the invention, there are fewer fiber ends and the generation of fluff is notably reduced, thereby allowing a smooth coating surface to be obtained.

The second feature of the invention is that a melt blown fiber nonwoven fabric is situated in the middle layer and heat bonding is performed by a method such as heat pressing. For this construction, low-crystallinity melt blown fibers also function as the binder for the thermoplastic resin filament layer, thereby yielding a nonwoven fabric with an even higher strength. Specifically, it is possible to achieve remarkably high strength by a production method in which the spun melt blown fibers are collected so as to fall directly onto the thermoplastic resin filament layer.

The third feature of the invention is that the laminated nonwoven fabric has an apparent density of 0.67-0.91 g/cm$^3$. By specifying this range for the apparent density, the gaps between fibers in the melt blown fiber layer are sufficiently small and, as the thermoplastic resin filaments of the front layer and back layer situated above and below are firmly anchored, it is difficult for the fine fibers of the middle layer to shift position, thus effectively preventing strike-through of the coating resin.

In the support substrate of the invention, the coating resin is retained and hardens in the melt blown fiber layer serving as the middle layer, forming an anchor-like structure (hereinafter referred to as "anchoring effect"), and therefore the interface between the fibers and resin is resistant to detachment and high adhesion can be achieved. In this type of structure, the cleavage strength of the anchor section, i.e. the link section connecting the resin infiltrating into the melt blown fiber layer with the coating resin on the surface, is added as an increment to the interfacial detachment strength, and therefore the resulting detachment strength is very high.

Since the apparent density of the laminated nonwoven fabric is 0.67-0.91 g/cm$^3$ according to the invention, a sufficient amount of resin is able to enter the melt blown fiber layer and the gaps in the coating surface, thereby allowing high detachment strength to be achieved. It is also possible to simultaneously obtain the opposing properties of strike-through prevention and adhesion.

In a laminated nonwoven fabric forming a support substrate of the invention, heat bonding with a hot roll or the like is preferably used to obtain the specified apparent density.

For heat bonding with a hot roll or the like, the upper layer and lower layer of the support substrate are placed in direct contact with the heating source, and hence film-like liquid impermeable sections tend to partially form due to deformation or fusion caused by softening. Such liquid impermeable sections cannot easily exhibit the anchoring effect by the coating resin, and thus tend to impair the resin adhesive properties and result in detachment or tearing of the separation membrane under pressure fluctuation or backwashing.

In a support substrate of the invention, however, a melt blown fiber layer with satisfactory heat bonding properties is present in the middle layer and, therefore, integral lamination by heat bonding with the thermoplastic resin filament layers above and below can be easily accomplished even under low temperature heat treatment conditions, to obtain a laminated nonwoven fabric with minimal film formation of the fibers of the upper and lower layers.

The construction of a separation membrane support substrate of the invention will now be explained.

FIG. 1 is a schematic drawing showing an example of a cross-section of a separation membrane support substrate according to the invention. In FIG. 1, 1 is the front layer, 2 is the middle layer and 3 is the back layer.

When used as a reverse osmosis membrane or the like it may be subjected to heat treatment of 180° C. and higher, and it must be heat resistant. According to the invention, therefore, the melting point of the thermoplastic resin filaments and melt blown fibers is preferably 180° C. or higher.

According to the invention, the front layer is a filament nonwoven fabric having a thermoplastic resin filament layer as at least one layer, obtained by a spun bond method.

As thermoplastic resin filaments to be used in the front layer there are preferred polyester-based filaments such as highly heat-resistant PET, polybutylene terephthalate and polytrimethylene terephthalate, polyamide-based filaments such as nylon-6, nylon-66, nylon-610 and nylon-612, or copolymer or blend filaments which are composed mainly of these resins. Among these, polyester-based filaments are preferred because of their high strength and dimensional stability. They may also be modified by addition of small amounts of low-melting-point components such as polyolefins, in a range which does not affect the practical strength.

The thermoplastic resin filaments used in the front layer have a filament diameter of no greater than 30 μm. The filament diameter preferably does not exceed 30 μm because the surface smoothness is reduced and the resin coating becomes unstable. Increasing the surface smoothness by heat pressing produces a surface structure with more film-like sections as a result of crushing of the thick filaments, thereby inhibiting penetration of the coating resin. The filament diameter is preferably 7-30 μm and more preferably 7-20 μm.

The middle layer is at least one layer composed of melt blown fibers.

Because heat treatment may be necessary in the separation membrane production process, the melt blown fibers used are preferably polyester-based fibers such as highly heat-resistant PET, polybutylene terephthalate and polytrimethylene terephthalate, polyamide-based fibers such as nylon-6, nylon-66, nylon-610 and nylon-612, or copolymer or blend fibers which are composed mainly of these resins. Among these, polyester-based fibers are preferred for use because of their high strength and dimensional stability. They may also be modified by addition of small amounts of low-melting-point components such as polyolefins, in a range which does not affect the practical strength.

The melt blown fibers in the middle layer must have a fiber diameter of no greater than 5 μm and a fiber weight of 1 g/m$^2$ or greater, in a proportion of no greater than 30 wt % of the total fibers in the entire support substrate. If the fiber diameter exceeds 5 μm, the gaps between fibers will be too large and strike-through prevention of the coating resin will be inadequate. The preferred fiber diameter range is 1-3 μm.

If the fiber weight is less than 1 g/m², adequate strike-through prevention cannot be obtained. Also, if the melt blown fibers exceed 30 wt % of the total fibers in the entire support substrate, the amount of thermoplastic resin filaments in the support substrate will be too low. As the thermoplastic resin filaments perform the primary strength maintenance function for the support substrate, this will result in reduced strength of the support substrate despite the binder function of the melt blown fibers in the middle layer. The fiber basis weight in the middle layer is preferably 3-25 g/m², while it is preferably at least 1.5 wt % and more preferably 3-25 wt % of the total fibers in the entire support substrate.

According to the invention, the back layer is a filament nonwoven fabric comprising at least one thermoplastic resin filament layer, obtained by a spun bond method.

The thermoplastic resin filaments used for the back layer may be composed of the same resin as for the thermoplastic resin filaments of the front layer, and preferably there are used polyester-based filaments such as highly heat-resistant PET, polybutylene terephthalate and polytrimethylene terephthalate, polyamide-based filaments such as nylon-6, nylon-66, nylon-610 and nylon-612, or copolymer or blend filaments which are composed mainly of these resins. Among these, polyester-based filaments are especially preferred for use because of their high strength and dimensional stability in humid conditions. They may also be modified by addition of small amounts of low-melting-point components such as polyolefins, in a range which does not affect the practical strength.

The thermoplastic resin filaments in the back layer have a filament diameter of 7-20 μm. If the filament diameter is less than 7 μm, the gaps between filaments will approach the melt blown fiber layer (middle layer) and increase the force of capillary action attracting the coating resin retained in the melt blown layer, thus making it impossible to achieve an adequate strike-through preventing function.

If the filament diameter exceeds 20 μm, the gaps between filaments will become too wide making it impossible to achieve adequate anchoring of the melt blown fibers and permitting shifting of the melt blown fibers under the pressure applied during coating, thereby widening the gaps between fibers of the middle layer and reducing the strike-through preventing function. The preferred filament diameter range is 10-15 μm.

The basis weight of the thermoplastic resin filaments used in the back layer is 3 g/m² or greater. As the thermoplastic resin filaments in the back layer perform the role of anchoring the melt blown fibers in the middle layer, a thermoplastic resin filament basis weight of less than 3 g/m² will result in insufficient anchoring of the melt blown fibers, tending to allow shifting of the melt blown fibers and reducing the strike-through preventing function. The preferred range for the filament basis weight is 3-40 g/m².

Using the same type of thermoplastic resin for the front layer, middle layer and back layer is preferred for increased adhesion of the entire laminated nonwoven fabric, and especially the use of the same polyester-based resin is preferred in order to achieve satisfactory dimensional stability and high strength.

The support substrate of the invention comprises a thermoplastic resin filament web ($S_1$) for the front layer, a melt blown fiber web (M) for the middle layer and a thermoplastic resin filament web ($S_2$) for the back layer, laminated in a $S_1/M/S_2$ structure. The front layer, middle layer and back layer may each be composed of one or more layers, for example, with a structure containing two middle layers such as $S_1/M/M'/S_2$.

Alternatively, the structure may have two each of the front layer, middle layer and back layer, such as $S_1/S'_1/M/M'/s_2/S'_2$.

The support substrate of the invention is composed of a laminated nonwoven fabric with an apparent density of 0.67-0.91 g/cm³. If the apparent density is less than 0.67 g/cm³, the gaps between the melt blown fibers will be widened and adhesion with the thermoplastic resin filaments will be weakened, thereby leading to inferior strike-through prevention. If the apparent density is greater than 0.91 g/cm³, the density will be too high and fewer gaps will be present to allow penetration of the coating resin, such that integration between the resin and support substrate will be inadequate. The apparent density is more preferably 0.69-0.83 g/cm³.

When heat bonding is carried out adequately to the interior of the laminated nonwoven fabric in an attempt to obtain a laminated nonwoven fabric with high apparent density, it may be necessary to carry out the heat bonding at high temperature and/or high pressure. However, when heat bonding is carried out at high temperature and/or high pressure, the surface fibers may undergo deformation or film formation, and when heat bonding is carried out at low temperature and high pressure, the low degree of adhesion between fibers may result in generation of fluff.

However, as the present invention employs melt blown fibers in the middle layer which have low crystal orientation and begin to adhere at a temperature above the glass transition temperature, it is possible to realize adequate heat bonding more readily to the interior at a lower temperature than in the prior art, without resulting in deformation of the surface fibers or film formation or generation of fluff.

According to the invention, the thickness of the entire laminated nonwoven fabric must be 45-110 μm. If the thickness is less than 45 μm, strike-through prevention for the resin will be insufficient even with a high apparent density, while if it is greater than 110 μm, the support substrate will be too thick and the object of the invention (reduced thickness) will not be achieved. The thickness is preferably in the range of 60-100 μm.

The support substrate of the invention is integrally laminated by heat bonding. Specifically, as self-adhesion of the thermoplastic resin is the only bonding force, no impurities are eluted out of the support substrate and therefore impurities do not contaminate solutions purified by separation with the separation membrane.

The support substrate of the invention preferably has a smoothness of 0.2-2 μm, in terms of KES surface roughness SMD, on the surface of the coating side. A surface smoothness in this range will reduce pinholes in the coating resin.

The support substrate of the invention also preferably has a formation index of no greater than 120. The formation index is an indicator of uniformity, and if it is no greater than 120, local strike-through of the coating resin will be reduced.

According to the invention, the resin used for coating is not particularly restricted so long as it exhibits performance as a separation membrane. As examples there may be mentioned polysulfone, polyethersulfone, polyphenylenesulfones, polyphenylenesulfide sulfone, polyacrylonitrile, polyvinylidene chloride, cellulose acetate, polyurethane, polyolefins and the like.

A preferred production process for a support substrate according to the invention will now be explained.

The laminated nonwoven fabric forming the support substrate of the invention is obtained by a production process satisfying the following conditions (a) to (d).

(a) a thermoplastic resin filament is spun on a conveyor using a thermoplastic resin with a melting point of 180° C. or higher to form at least one nonwoven fabric layer, (b) at least one layer of fibers with a crystallinity of 15-40% and a fiber diameter of no greater than 5 μm, composed of a thermoplastic resin with a melting point of 180° C. or higher, is laminated thereover by a melt blow method, (c) at least one layer of a nonwoven fabric of thermoplastic resin filaments composed of a thermoplastic resin with a melting point of 180° C. or higher is further laminated, and (d) a flat roll is used for heat bonding at a temperature of 50-120° C. below the melting point of the thermoplastic resin filaments, at a line pressure of 100-1000 N/cm, after which calender treatment is carried out at a temperature of at least 10° C. higher than the aforementioned heat bonding temperature and 10-100° C. lower than the melting point of the thermoplastic resin filaments, at a line pressure of 100-1000 N/cm.

The spinning method for the thermoplastic resin filaments is preferably a known spun bond method.

The main feature of the production process of the invention is that the fine fiber layer is blown directly onto the thermoplastic resin filament web by a melt blow method, so that the melt blown fibers are allowed to penetrate into the thermoplastic resin filament web. As mentioned above, penetration of the melt blown fibers into the thermoplastic resin filament web results in firm anchoring of each layer, so that not only is the strength of the laminated nonwoven fabric improved but the fine fibers in the middle layer are resistant to shifting by external forces, thereby providing excellent strike-through prevention.

The method used to control the degree of penetration is preferably one in which the relative distance between the melt blow spinning nozzle and the thermoplastic resin filament web surface on the conveyor is set to about 12 cm, and the aspiration force for attraction from the back side of the conveyor is adjusted.

Moreover, although the reason is not fully understood, it was surprisingly found that using a resin with a relatively high melting point as the thermoplastic resin for the melt blown fibers better facilitates penetration of the melt blown fibers. Thus, it is preferred to use a resin with a high melting point of 180° C. or above, such as PET or polyamide, as the thermoplastic resin. Also, a crystallinity of 15-40% for the melt blown fibers is preferred for more satisfactory adhesion and penetration.

In the case of PET, using a resin with a solution viscosity ($\eta sp/c$) of preferably 0.2-0.8 and more preferably 0.2-0.6 will allow adjustment of the crystallinity of the melt blown fibers in a range of 15-40% under ordinary melt blow spinning conditions.

In the case of a polyamide, using a resin with a relative viscosity ($\eta rel$) of preferably 1.8-2.7 and more preferably 1.8-2.2 will allow adjustment of the crystallinity of the melt blown fibers in a range of 15-40% under ordinary melt blow spinning conditions.

As high dimensional stability under humid conditions is preferred for the support substrate of the invention, it is preferred to use a polyester resin. Specifically, the resin forming the melt blown fibers is preferably PET with a solution viscosity ($\eta sp/c$) of 0.2-0.8, and more preferably the crystallinity of the melt blown fibers is 15-40%.

The manner of penetration of the melt blown fibers is, specifically, not penetration of single fibers in the form of whiskers or tangles into the thermoplastic resin filament layer, but rather sections with multiple fibers penetrating in a group are formed, such that the penetrated layer has an embedded or entangled arrangement with a portion of the filaments enclosed. Moreover, the structure of a portion of the penetrated melt blown fibers adhering to the thermoplastic resin filaments is in a form present across the whole area as a mixed layer of the melt blown fibers and the thermoplastic resin filaments.

A heat bonding step may be carried out for bonding using a flat roll at a temperature of 50-120° C. below the melting point of the thermoplastic resin filaments and a line pressure of 100-1000 N/cm, followed by calender treatment at a temperature of at least 10° C. higher than the aforementioned heat bonding temperature and 10-100° C. lower than the melting point of the thermoplastic resin filaments, at a line pressure of 100-1000 N/cm, to obtain sufficient strength and an apparent density in the range of the invention.

If the temperature for calender treatment is lower than the melting point of the thermoplastic resin filaments and the difference is less than 10° C. the apparent density will be too high, and if it is lower than the melting point of the thermoplastic resin filaments and the difference is greater than 100° C., the strength will be insufficient and fluff will tend to be generated on the surface, resulting in coating layer defects.

If the line pressure for the heat bonding step and calender treatment is less than 100 N/cm the adhesion will be inadequate and sufficient strength will not be exhibited. If it exceeds 1000 N/cm, the fibers will undergo excessive deformation and the apparent density will be higher than the range of the invention.

BEST MODE FOR CARRYING OUT THE INVENTION

Figure 1:
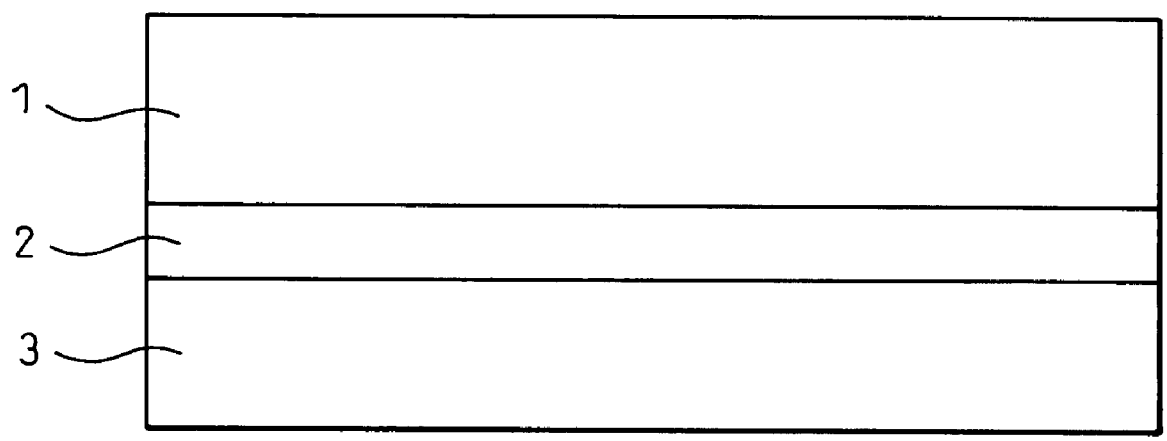
FIG. 1 is a schematic drawing showing an example of a cross-section of a separation membrane support substrate according to the invention.

The present invention will now be explained in greater detail, by examples, with the understanding that the invention is in no way restricted by the examples.

The measuring methods and evaluation methods were as follows.

(1) Fiber Basis Weight ($g/m^2$)

This was measured according to JIS-L-1906. Three 20-cm length×25-cm width test pieces were taken for every 1 m width of material, the weight was measured, and the average value was calculated to determine the weight per unit area.

(2) Thickness (μm)

This was measured according to JIS-L-1906. The thickness was measured at 10 locations along the width at a contact pressure load of 100 $g/cm^2$, and the average value was calculated. The thickness gauge used was a Peacock No. 207. Because the minimum scale mark was 0.01, it was read to three decimal places and averaged, and then rounded to two significant digits and recorded as μm.

(3) Apparent Density ($g/cm^3$)

The fiber basis weight ($g/m^2$) measured in (1) and the thickness (μm) measured in (2) were used for calculation by the following formula.

$$\text{Apparent density} = (\text{fiber basis weight})/(\text{thickness})$$

(4) Fiber Diameter (μm)

After removing 10 cm from the edges of the sample (nonwoven fabric), a 1-cm square test piece was cut out from regions every 20 cm along the width of the sample. Each test piece was measured for fiber diameter at 30 points using a microscope, and the average of the measured values (rounded off to two decimal places) was calculated and recorded as the diameter of the fibers composing the sample.

(5) Tensile Strength (kg/5 cm)

After removing 10 cm from the edges of the sample (non-woven fabric), a 3-cm width×20-cm length test piece was cut out. A load was applied until the test piece broke, and the average value for the strength of the test piece at the time of maximum load was determined in the MD (machine direction).

(6) Crystallinity (%)

Approximately 8 mg of a sample (fibers) was weighed out and placed in a sample pan, and a sample was prepared using a sample sealer.

A DSC210 by SII Nanotechnology Co., Ltd. was used for measurement under the following conditions.

Measuring atmosphere: 50 ml/min nitrogen gas
Temperature elevating rate: 10° C./min
Measuring temperature range: 25-300° C.

Polyester fibers have a cold crystallizing portion, and therefore the crystallinity was determined by the following formula (rounded off to two decimal places).

Crystallinity(%)=[(heat quantity of melted portion)−(heat quantity of cold crystal portion)]/(heat quantity of total crystal)

The heat quantity values used were those listed in the following literature.

Heat quantity of PET total crystal: 126.4 J/g ("Macromol. Physics" Academic Press, New York & London Vol. 1, P389 (1973))

Heat quantity of PP total crystal: 165 J/g (J. Chem. Phys. Ref. Data, 10(4) 1981 1051)

Heat quantity of nylon-66 total crystal: 190.8 J/g (J. Polymer Scial., 1 2697(196.3))

(7) Melting Point (° C.)

Measurement was carried out in the same manner as (6) above, and the melting point was defined as the temperature where the asymptote for the inflection point at the introduction of the melting peak crossed with the baseline in the temperature region higher than Tg.

(8) Solution Viscosity (ηsp/c)

A 0.025 g portion of a sample was dissolved in 25 ml of orthochlorophenol (OCP). The solution was heated to 90° C. (or to 120° C. if necessary for dissolution). Measurement was conducted in a viscosity tube at a measuring temperature of 35° C., and the calculation was performed using the following formula. The arithmetic average of three measured points of the sample was taken and the value was rounded off to three decimal places.

$$\eta sp/c=[(t-t0)/t0]/c$$

In this formula, t is the solution passage time (sec), t0 is the solvent passage time (sec) and c is the amount of solute (g) per 1000 ml.

(9) Relative Viscosity (ηrel)

A 0.025 g portion of sample was dissolved in 25 ml of 98% sulfuric acid. Measurement was conducted in a viscosity tube at a measuring temperature of 25° C., and calculation was performed by the following formula. The arithmetic average of three measured points of the sample was taken and the value was rounded off to two decimal places.

$$\eta rel=t/t0$$

In the formula, t is the solution passage time (sec) and t0 is the solvent passage time (sec).

(10) Strike-Through Prevention

As a coating resin stock solution there was used a solution of polysulfone in dimethylformamide (DMF) (20 wt % concentration). The stock solution was coated onto a support substrate fixed on a stainless steel sheet by 200 μm-thick and, after two seconds, was dipped in purified water at 20° C., allowed to coagulate, rinsed and dewatered, and then dried with a hot air drier at 80° C. to obtain a separation membrane.

The evaluation was conducted based on the following scale.

Good: No resin found adhering to stainless steel sheet.
Poor: Resin adhered to stainless steel sheet.

(11) Adhesion (Peel Strength: N/1.5 cm)

The separation membrane obtained in (10) above was used as a sample for measurement of the peel strength of the coating resin film. A tensile tester was used to measure the stress required for peeling between the support substrate and coating resin film at a speed of 200 mm/min, with a width of 1.5 cm. The measurement was conducted at 3 points, and the average was recorded as an index of the adhesion (rounded off to two decimal places).

(12) Surface Roughness SMD (μm)

The surface smoothness of the coating side of the support substrate was measured using a KES FB-4 by Katotech Co., Ltd. The surface roughness SMD was measured in the MD direction under standard conditions (fabric tension: 400 gf/20 cm, initial load: 10 gf) at 3 points, and the average was recorded. A smaller value indicates a more excellent surface smoothness.

(13) Formation Index

An FMT-MIII formation tester (U.S. Pat. No. 1,821,351, Nomura Shoji Co., Ltd.) was used for measurement in the CD direction at 4 points per meter, to determine the formation index. A smaller value indicates formation uniformity and lack of spots.

Examples 1-14, 18, Comparative Examples 2, 4-6, 8-12

As the back layer, ordinary PET was used for extrusion toward a filament group-shifting collecting net, and spinning was carried out by a spun bond method at a spinning temperature of 300° C., at a spinning speed of 3500 m/min, after which the filaments were sufficiently opened by corona charging to about 3 μC/g, to prepare a thermoplastic resin filament web on the collecting net. The filament diameter was adjusted by changing the discharge volume.

Next, for the middle layer, PET (solution viscosity: ηsp/c=0.50) was used for spinning by a melt blow method under conditions with a spinning temperature of 300° C. and heated air at 1000 Nm³/hr/m, and blowing onto the thermoplastic resin filament web. Here, the distance from the melt blow nozzle to the thermoplastic resin filament web was 100 mm, the suction force on the collecting surface directly under the melt blow nozzle was 0.2 kPa, and the air speed was 7 m/sec. The fiber diameter and crystallinity were adjusted by changing the discharge volume.

Thermoplastic resin filaments were laminated with prescribed filament diameters and filament basis weights directly onto each obtained laminated web as a front layer, by the same method as for the first thermoplastic resin filament web, to obtain laminated webs each having the structure of front layer: thermoplastic resin filaments ($S_1$)/middle layer: melt blown fibers (M)/back layer: thermoplastic resin filaments ($S_2$). Each obtained laminated web was subjected to heat bonding with a flat roll under the conditions shown in Table 2, and then a calender roll was used under the conditions also shown in Table 2 for adjustment of the thickness and apparent density to the respective apparent densities as shown in Table 2, to obtain laminated nonwoven fabrics.

The supports made of the obtained laminated nonwoven fabrics and their evaluation results are shown in Tables 1 and 2.

The Comparative Examples 2 and 9 which had thick filament diameters for the surface and back layers, Comparative Example 8 which had thin filaments for the back layer and Comparative Example 10 which had a low filament basis weight for the back layer, all exhibited inferior strike-through prevention.

The cause of strike-through in Comparative Example 2 was attributed to notable sparse sections in the coating surface, due to the large filament diameter of the front layer. The strike-through prevention was also poor in Comparative Example 4 which had a large fiber diameter for the melt blown layer and Comparative Example 5 which had a small fiber diameter.

Comparative Example 6 which had an excessively high proportion for the melt blown fiber layer exhibited insufficient tensile strength.

Comparative Example 11 which had an excessively low apparent density exhibited poor strike-through prevention. This was attributed to inadequate anchoring by the melt blown fibers. Also, Comparative Example 12 which had an excessively high apparent density exhibited unsatisfactory adhesion due to poor permeability of the coating resin.

Example 15

A laminated nonwoven fabric having a thermoplastic resin filament/melt blown fiber/thermoplastic resin filament structure was obtained in the same manner as Example 1. However, the heat bonding conditions with the flat roll were a line pressure of 367 N/cm and a roll temperature of 225° C. on the surface side (coating side) and 215° C. on the back side.

The support made of the obtained laminated nonwoven fabric and its evaluation results are shown in Tables 1 and 2.

Example 16

A laminated nonwoven fabric was obtained in the same manner as Example 1, except that the calender roll temperature was 231° C. for both the surface and back sides, and the line pressure was 570 N/cm. The surface smoothness of the support substrate composed of the obtained laminated nonwoven fabric is shown in Table 3 together with the surface smoothness of the support substrate obtained in Example 1.

The surface of Example 1 had excellent smoothness. For Example 16, some streaks were apparent due to fine irregularities in the coating surface, but the surface smoothness was satisfactory and no significant problems were encountered in coating.

Example 17

A laminated nonwoven fabric was obtained in the same manner as Example 1, except that the corona charge was 1.7 µC/g. The formation index of the support substrate composed of the obtained laminated nonwoven fabric is shown in Table 4, together with the formation index of the support substrate obtained in Example 1. The formation indexes of both Example 1 and Example 17 were below 120, the formation was uniform and the strike-through prevention was satisfactory.

Comparative Example 1

For the front layer, PET staple fibers with a fiber diameter of 16 µm and a fiber length of 5 mm were collected on a net by a wet laid method to a basis weight of 16 g/m², dewatered and dried, and then contact bonded with a flat roll to an extent without dissipation of the fibers, to obtain a staple fiber web.

Next, as the middle layer, melt blown fibers were blown onto the web in the same manner as Example 1 and a thermoplastic resin filament web was laminated thereover as a back layer. The obtained laminated web was heat bonded with a flat roll and calender roll to obtain a laminated nonwoven fabric.

The support made of the obtained laminated nonwoven fabric and its evaluation results are shown in Tables 1 and 2. The support substrate composed of the laminated nonwoven fabric exhibited strike-through of the coating resin and low tensile strength. It is believed that strike-through occurred because the melt blown fiber layer could not withstand the coating pressure, as the PET staple fiber layer was unable to firmly anchor the melt blown fibers of the middle layer.

Comparative Example 3

As the back layer, ordinary PET was used for extrusion toward a filament group-shifting collecting net, and spinning was carried out by a spun bond method at a spinning temperature of 300° C., at a spinning speed of 3500 m/min, after which the filaments were sufficiently opened by corona charging to about 3 µC/g, to prepare a thermoplastic resin filament web on the collecting net. The filament diameter was adjusted by changing the discharge volume.

As the middle layer, PET staple fibers with a fiber diameter of 5 µm and a fiber length of 3 mm were collected on a net to 12 g/m² by a wet laid method, dewatered and dried, and then contact bonded with a flat roll to an extent without dissipation of the fibers, to obtain a staple fiber web.

The staple fiber web was laminated onto the previously prepared thermoplastic resin filament web, and then a thermoplastic resin filament web was spun to a prescribed filament diameter and filament basis weight and laminated onto the laminate as a front layer in the same manner as the previous thermoplastic resin filament web, to obtain a laminated web having a thermoplastic resin filament/melt blown fiber/thermoplastic resin filament structure. The obtained laminated web was heat bonded with a flat roll and calender roll to obtain a laminated nonwoven fabric.

The support made of the obtained laminated nonwoven fabric and its evaluation results are shown in Tables 1 and 2. The support substrate composed of the laminated nonwoven fabric had low tensile strength and exhibited strike-through of the coating resin. It is believed that strike-through occurred because the staple fibers of the middle layer being ultrafine and having low adhesion were unable to withstand the pressure during coating.

Comparative Example 7

As the front layer, ordinary PET was used for extrusion toward a filament group-shifting collecting net, and spinning was carried out by a spun bond method at a spinning temperature of 300° C., at a spinning speed of 3500 m/min, after which the filaments were sufficiently opened by corona charging to about 3 μC/g, to prepare a thermoplastic resin filament web on the collecting net. The filament diameter was adjusted by changing the discharge volume.

Next, for the middle layer, PET (solution viscosity: ηsp/c=0.50) was used for spinning by a melt blow method under conditions with a spinning temperature of 300° C. and heated air at 1000 Nm³/hr/m, and the obtained fibers were blown onto the thermoplastic resin filament web. Here, the distance from the melt blow nozzle to the thermoplastic resin filament web was 100 mm, the suction force on the collecting surface directly under the melt blow nozzle was 0.2 kPa, and the air speed was 7 m/sec. The fiber diameter and crystallinity were adjusted by changing the discharge volume.

For the back layer, PET staple fibers with a fiber diameter of 16 μm and a fiber length of 5 mm were collected on a net by a wet laid method to a basis weight of 16 g/m², dewatered and dried, and then contact bonded with a flat roll and calender roll to an extent without dissipation of the fibers, to obtain a staple fiber web.

The staple fiber web was laminated onto the previously prepared thermoplastic resin filament web/melt blown fiber web and heat bonded with a flat roll to obtain a laminated nonwoven fabric.

The support made of the obtained laminated nonwoven fabric and its evaluation results are shown in Tables 1 and 2. The support substrate composed of the laminated nonwoven fabric exhibited strike-through and had low tensile strength. It is believed that strike-through occurred because the PET staple fiber layer could not adequately anchor the melt blown fibers of the middle layer, resulting in shifting of the melt blown fibers by the pressure during coating.

Comparative Example 13

PET staple fibers with a fiber diameter of 16 μm and a fiber length of 5 mm were collected on a net by a wet laid method to 70 g/m², dewatered and dried, and then contact bonded with a calender roll to obtain a nonwoven fabric.

The obtained nonwoven fabric and its evaluation results are shown in Tables 1 and 2.

The support substrate composed of the nonwoven fabric had no smoothness problems, but the tensile strength was low and strike-through was extensive.

Comparative Example 14

PET staple fibers with a fiber diameter of 10 μm and a fiber length of 5 mm were collected on a net to 70 g/m² by a wet laid method, dewatered and dried, and then contact bonded with a calender roll to an extent of not dissipating the fibers, to obtain a nonwoven fabric. The obtained nonwoven fabric and its evaluation results are shown in Tables 1 and 2.

The support substrate composed of the nonwoven fabric had numerous projections due to tangling of the fibers, and was thus unsuitable for resin coating.

The results are shown in Tables 1 to 4.

In Tables 1 to 4, PET stands for polyethylene terephthalate, NY for nylon, MB for melt blown web, SB for spun bond web and SL for spun lace web.

TABLE 1

| | Front layer | | | | Middle layer | | | |
|---|---|---|---|---|---|---|---|---|
| | Fiber type | Fiber diameter μm | Fiber basis weight g/m² | Melting point ° C. | Fiber type | Fiber diameter μm | Fiber basis weight g/m² | Fiber weight ratio wt % | Crystallinity % |
| Example 1 | PET SB | 16 | 29 | 260 | PET MB | 1.6 | 12 | 17.1 | 30 |
| Example 2 | PET SB | 16 | 29 | 260 | PET MB | 3 | 12 | 17.1 | 30 |
| Example 3 | PET SB | 16 | 29 | 260 | MB PET/NY | 1.6 | 12 | 17.1 | 30 |
| Example 4 | PET SB | 16 | 29 | 260 | PET MB | 1.6 | 12 | 17.1 | 35 |
| Example 5 | PET SB | 30 | 29 | 260 | PET MB | 1.6 | 12 | 17.1 | 30 |
| Example 6 | PET SB | 16 | 29 | 260 | PET MB | 5 | 12 | 17.1 | 30 |
| Example 7 | PET SB | 16 | 29 | 260 | PET MB | 1.6 | 1 | 1.7 | 30 |
| Example 8 | PET SB | 16 | 20 | 260 | PET MB | 1.6 | 17 | 29.8 | 30 |
| Example 9 | PET SB | 16 | 29 | 260 | PET MB | 1.6 | 12 | 17.1 | 30 |
| Example 10 | PET SB | 16 | 29 | 260 | PET MB | 1.6 | 12 | 17.1 | 30 |
| Example 11 | PET SB | 16 | 29 | 260 | PET MB | 1.6 | 12 | 27.3 | 30 |
| Example 12 | PET SB | 16 | 24 | 260 | PET MB | 1.6 | 12 | 20.0 | 30 |
| Example 13 | PET SB | 16 | 34 | 260 | PET MB | 1.6 | 14 | 17.1 | 30 |
| Example 14 | PET SB | 16 | 29 | 180 | PET MB | 1.6 | 12 | 17.1 | 30 |
| Example 15 | PET SB | 16 | 29 | 260 | PET MB | 1.6 | 12 | 17.1 | 30 |
| Example 18 | PET SB | 12 | 28 | 260 | PET MB | 1.8 | 11 | 16.7 | 30 |
| Comp. Ex. 1 | PET SL | 16 | 29 | 260 | PET MB | 1.6 | 12 | 17.1 | 30 |
| Comp. Ex. 2 | PET SB | 35 | 29 | 260 | PET MB | 1.6 | 12 | 17.1 | 30 |
| Comp. Ex. 3 | PET SB | 16 | 29 | 260 | PET SL | 5 (3 mm) | 12 | 17.1 | 50 |
| Comp. Ex. 4 | PET SB | 16 | 29 | 260 | PET MB | 7 | 12 | 17.1 | 30 |
| Comp. Ex. 5 | PET SB | 16 | 29 | 260 | PET MB | 1.6 | 0.8 | 1.4 | 30 |
| Comp. Ex. 6 | PET SB | 16 | 15 | 260 | PET MB | 1.6 | 30 | 50.0 | 30 |
| Comp. Ex. 7 | PET SB | 16 | 29 | 260 | PET MB | 1.6 | 12 | 17.1 | 30 |
| Comp. Ex. 8 | PET SB | 16 | 29 | 260 | PET MB | 1.6 | 12 | 17.1 | 30 |
| Comp. Ex. 9 | PET SB | 16 | 29 | 260 | PET MB | 1.6 | 12 | 17.1 | 30 |
| Comp. Ex. 10 | PET SB | 16 | 50 | 260 | PET MB | 1.6 | 12 | 18.8 | 30 |
| Comp. Ex. 11 | PET SB | 16 | 20 | 260 | PET MB | 1.6 | 8 | 16.7 | 30 |

TABLE 1-continued

| | | | | | | | | | |
|---|---|---|---|---|---|---|---|---|---|
| Comp. Ex. 12 | PET SB | 16 | 33 | 260 | PET MB | 1.6 | 18 | 21.4 | 30 |
| Comp. Ex. 13 | SL | 16 (5 mm) | 70 | 260 | | | | | |
| Comp. Ex. 14 | SL | 10 (5 mm) | 70 | 260 | | | | | |

| | Middle layer | | | Back layer | | |
|---|---|---|---|---|---|---|
| | | | | | Fiber | |
| | Solution viscosity | Melting point ° C. | Fiber type | Fiber diameter μm | basis weight g/m² | Melting point ° C. |
| Example 1 | 0.5 | 260 | PET SB | 16 | 29 | 260 |
| Example 2 | 0.5 | 260 | PET SB | 16 | 29 | 260 |
| Example 3 | 0.5 | 260 | PET SB | 16 | 29 | 260 |
| Example 4 | 0.9 | 260 | PET SB | 16 | 29 | 260 |
| Example 5 | 0.5 | 260 | PET SB | 16 | 29 | 260 |
| Example 6 | 0.5 | 260 | PET SB | 16 | 29 | 260 |
| Example 7 | 0.5 | 260 | PET SB | 16 | 29 | 260 |
| Example 8 | 0.5 | 260 | PET SB | 16 | 20 | 260 |
| Example 9 | 0.5 | 260 | PET SB | 7 | 29 | 260 |
| Example 10 | 0.5 | 260 | PET SB | 20 | 29 | 260 |
| Example 11 | 0.5 | 260 | PET SB | 16 | 3 | 260 |
| Example 12 | 0.5 | 260 | PET SB | 16 | 24 | 260 |
| Example 13 | 0.5 | 260 | PET SB | 16 | 34 | 260 |
| Example 14 | 0.5 | 180 | PET SB | 16 | 29 | 180 |
| Example 15 | 0.5 | 260 | PET SB | 16 | 29 | 260 |
| Example 18 | 0.5 | 260 | PET SB | 12 | 28 | 260 |
| Comp. Ex. 1 | 0.5 | 260 | PET SB | 16 | 29 | 260 |
| Comp. Ex. 2 | 0.5 | 260 | PET SB | 16 | 29 | 260 |
| Comp. Ex. 3 | 0.5 | 260 | PET SB | 16 | 29 | 260 |
| Comp. Ex. 4 | 0.5 | 260 | PET SB | 16 | 29 | 260 |
| Comp. Ex. 5 | 0.5 | 260 | PET SB | 16 | 29 | 260 |
| Comp. Ex. 6 | 0.5 | 260 | PET SB | 16 | 15 | 260 |
| Comp. Ex. 7 | 0.5 | 260 | PET SL | 16 | 29 | 260 |
| Comp. Ex. 8 | 0.5 | 260 | PET SB | 6 | 29 | 260 |
| Comp. Ex. 9 | 0.5 | 260 | PET SB | 25 | 29 | 260 |
| Comp. Ex. 10 | 0.5 | 260 | PET SB | 16 | 2 | 260 |
| Comp. Ex. 11 | 0.5 | 260 | PET SB | 16 | 20 | 260 |
| Comp. Ex. 12 | 0.5 | 260 | PET SB | 16 | 33 | 260 |
| Comp. Ex. 13 | | | | | | |
| Comp. Ex. 14 | | | | | | |

TABLE 2

| | Support substrate | | | Heat bonding conditions | | Calendering conditions | | Adhesion | | |
|---|---|---|---|---|---|---|---|---|---|---|
| | Fiber weight g/m² | Thickness μm | Apparent density g/cm³ | Line pressure N/cm | Temperature (front/back) ° C. | Line pressure N/cm | Temperature (front/back) ° C. | Tensile strength kg/5 cm | (peel strength) N/1.5 cm | Strike-through prevention |
| Example 1 | 70 | 90 | 0.78 | 265 | 180/180 | 663 | 236/231 | 37 | 1.56 | good |
| Example 2 | 70 | 90 | 0.78 | 265 | 180/180 | 663 | 236/231 | 37 | 1.56 | good |
| Example 3 | 70 | 90 | 0.78 | 265 | 180/180 | 663 | 236/231 | 34 | 1.65 | good |
| Example 4 | 70 | 90 | 0.78 | 265 | 180/180 | 663 | 236/231 | 31 | 1.47 | good |
| Example 5 | 70 | 90 | 0.78 | 265 | 180/180 | 663 | 236/231 | 37 | 1.28 | good |
| Example 6 | 70 | 90 | 0.78 | 265 | 180/180 | 663 | 236/231 | 37 | 1.74 | good |
| Example 7 | 59 | 80 | 0.74 | 265 | 180/180 | 663 | 231/226 | 34 | 1.74 | good |
| Example 8 | 57 | 70 | 0.81 | 265 | 180/180 | 663 | 231/226 | 25 | 1.56 | good |
| Example 9 | 70 | 90 | 0.78 | 265 | 180/180 | 663 | 236/231 | 42 | 1.74 | good |
| Example 10 | 70 | 90 | 0.78 | 265 | 180/180 | 663 | 236/231 | 31 | 1.56 | good |
| Example 11 | 44 | 60 | 0.73 | 265 | 180/180 | 663 | 226/221 | 25 | 1.56 | good |
| Example 12 | 60 | 90 | 0.67 | 265 | 180/180 | 600 | 236/231 | 31 | 1.74 | good |
| Example 13 | 82 | 90 | 0.91 | 265 | 180/180 | 730 | 236/231 | 37 | 1.10 | good |
| Example 14 | 70 | 90 | 0.78 | 265 | 180/180 | 663 | 236/231 | 31 | 1.56 | good |
| Example 15 | 70 | 95 | 0.74 | 367 | 225/215 | | | 32 | 1.60 | good |
| Example 18 | 68 | 88 | 0.77 | 265 | 180/180 | 663 | 236/231 | 37 | 1.56 | good |
| Comp. Ex. 1 | 70 | 90 | 0.78 | 265 | 180/180 | 663 | 236/231 | 15 | 1.28 | poor |
| Comp. Ex. 2 | 70 | 90 | 0.78 | 265 | 180/180 | 663 | 236/231 | 25 | 1.10 | poor |
| Comp. Ex. 3 | 70 | 90 | 0.78 | 265 | 180/180 | 663 | 236/231 | 15 | 1.28 | poor |
| Comp. Ex. 4 | 70 | 90 | 0.78 | 265 | 180/180 | 663 | 236/231 | 37 | 1.74 | poor |
| Comp. Ex. 5 | 58.8 | 80 | 0.74 | 265 | 180/180 | 663 | 231/226 | 31 | 1.74 | poor |
| Comp. Ex. 6 | 60 | 90 | 0.67 | 265 | 180/180 | 663 | 231/226 | 15 | 1.74 | good |
| Comp. Ex. 7 | 70 | 90 | 0.78 | 265 | 180/180 | 663 | 236/231 | 15 | 1.28 | poor |
| Comp. Ex. 8 | 70 | 90 | 0.78 | 265 | 180/180 | 663 | 236/231 | 34 | 1.74 | poor |
| Comp. Ex. 9 | 70 | 90 | 0.78 | 265 | 180/180 | 663 | 236/231 | 29 | 1.74 | poor |
| Comp. Ex. 10 | 64 | 90 | 0.71 | 265 | 180/180 | 663 | 231/226 | 29 | 1.65 | poor |

TABLE 2-continued

|  | Support substrate | | | Heat bonding conditions | | Calendering conditions | | Adhesion | | |
| --- | --- | --- | --- | --- | --- | --- | --- | --- | --- | --- |
|  | Fiber weight g/m² | Thickness μm | Apparent density g/cm³ | Line pressure N/cm | Temperature (front/back) ° C. | Line pressure N/cm | Temperature (front/back) ° C. | Tensile strength kg/5 cm | (peel strength) N/1.5 cm | Strike-through prevention |
| Comp. Ex. 11 | 48 | 80 | 0.60 | 265 | 180/180 | 400 | 236/231 | 31 | 1.74 | poor |
| Comp. Ex. 12 | 84 | 90 | 0.93 | 265 | 180/180 | 820 | 236/231 | 37 | 0.73 | good |
| Comp. Ex. 13 | 70 | 90 | 0.78 |  |  | 663 | 236/231 | 9 | 0.55 | poor |
| Comp. Ex. 14 | 70 | 90 | 0.78 |  |  | 663 | 236/231 | 25 | 1.10 | poor |

TABLE 3

|  |  | Example 1 | Example 16 |
| --- | --- | --- | --- |
| Front layer | Fiber type | PET SB | PET SB |
|  | Fiber diameter (μm) | 16 | 16 |
|  | Fiber basis weight (g/m²) | 29 | 29 |
|  | Melting point (° C.) | 260 | 260 |
| Middle layer | Fiber type | PET MB | PET MB |
|  | Fiber diameter (μm) | 1.6 | 1.6 |
|  | Fiber basis weight (g/m²) | 12 | 12 |
|  | Fiber weight ratio (wt %) | 17.1 | 17.1 |
|  | Crystallinity (%) | 30 | 30 |
|  | Solution viscosity | 0.5 | 0.5 |
|  | Melting point (° C.) | 260 | 260 |
| Back layer | Fiber type | PET SB | PET SB |
|  | Fiber diameter (μm) | 16 | 16 |
|  | Fiber weight (g/m²) | 29 | 29 |
|  | Melting point (° C.) | 260 | 260 |
| Support substrate | Fiber basis weight (g/m²) | 70 | 70 |
|  | Thickness (μm) | 90 | 104 |
|  | Apparent density (g/cm³) | 0.78 | 0.67 |
| Heat bonding conditions | Line pressure (N/cm) | 265 | 265 |
|  | Temperature (front/back) (° C.) | 180/180 | 180/180 |
| Calendering conditions | Line pressure (N/cm) | 663 | 570 |
|  | Temperature (front/back) (° C.) | 236/231 | 231/231 |
| Surface roughness SMD (μm) |  | 0.6 | 1.9 |
| Coating condition |  | Virtually no streaks | Small streaks found infrequently |

TABLE 4

|  |  | Example 1 | Example 17 |
| --- | --- | --- | --- |
| Front layer | Fiber type | PET SB | PET SB |
|  | Fiber diameter (μm) | 16 | 16 |
|  | Fiber basis weight (g/m²) | 29 | 29 |
|  | Melting point (° C.) | 260 | 260 |
|  | Corona charge (μC/g) | 3.0 | 1.7 |
| Middle layer | Fiber type | PET MB | PET MB |
|  | Fiber diameter (μm) | 1.6 | 1.6 |
|  | Fiber basis weight (g/m²) | 12 | 12 |
|  | Fiber weight ratio (wt %) | 17.1 | 17.1 |
|  | Crystallinity (%) | 30 | 30 |
|  | Solution viscosity | 0.5 | 0.5 |
|  | Melting point (° C.) | 260 | 260 |
| Back layer | Fiber type | PET SB | PET SB |
|  | Fiber diameter (μm) | 16 | 16 |
|  | Fiber basis weight (g/m²) | 29 | 29 |
|  | Melting point (° C.) | 260 | 260 |
|  | Corona charge (μC/g) | 3.0 | 1.7 |
|  | Fiber weight (g/m²) | 70 | 70 |
|  | Thickness (μm) | 90 | 95 |
|  | Apparent density (g/cm³) | 0.78 | 0.73 |
| Formation index |  | 91 | 115 |
| Strike-through prevention |  | good | good |

INDUSTRIAL APPLICABILITY

The separation membrane support substrate of the invention is thin and has practical strength while also exhibiting excellent strike-through prevention and resin coating suitability, and can therefore improve the productivity of separation membranes. In addition, as it allows the number of separation membranes per module to be increased, it is possible to improve the treatment capacity per module, while lengthening the usable life and permitting smaller module sizes.

Moreover, as the separation membrane support substrate of the invention has high adhesion with coating resins, it can be used for separation membranes that are subjected to backwash. Consequently, a separation membrane using a support substrate of the invention has high utility value in a wide range of fields including waste water treatment, water purification, seawater desalination, food concentration and pharmaceutical purification.

The invention claimed is:

1. A separation membrane support substrate composed of a laminated nonwoven fabric comprising a front layer as a coating layer to be coated with a resin, a middle layer, and a back layer, which are integrally formed by heat bonding and are subjected to calender treatment after the integral formation by heat bonding, wherein said laminated nonwoven fabric satisfies the following conditions (1) to (6);
    (1) the front layer has at least one layer comprising thermoplastic resin filaments with a single filament diameter of 7-30 μm;
    (2) the middle layer has at least one layer comprising melt blown fibers with a single fiber diameter of no greater than 5 μm, and a fiber basis weight of at least 1 g/m² and comprising no more than 30 wt % of the total fiber basis weight;
    (3) the back layer has at least one layer comprising thermoplastic resin filaments with a single filament diameter of 7-20 μm, and has a fiber basis weight of 3-40 g/m²;
    (4) the laminated nonwoven fabric has an apparent density of 0.67-0.91 g/cm³;
    (5) the laminated nonwoven fabric has a thickness of 45-110 μm; and
    (6) the smoothness of the coating layer surface is 0.2-2 μm in terms of the KES surface roughness SMD,
    wherein the thermoplastic resin in the filaments of the front and back layers is the same, and
    wherein a flat roll is used for said heat bonding at a temperature of 50-120° C. below the melting point of the thermoplastic resin filaments, after which said calender treatment is carried out at a temperature of at least 10° C. higher than the temperature of said heat bonding and 10-100° C. lower than the melting point of the thermoplastic resin filaments.

2. A separation membrane support substrate according to claim 1, characterized in that the filament diameter of the thermoplastic resin filaments used in the front layer is 7-20 μm.

3. A separation membrane support substrate according to claim 1 or 2, characterized in that the fiber diameter of the melt blown fibers is 1-3 μm.

4. A separation membrane support substrate according to claim 1 or 2, characterized in that the melting point of the thermoplastic resin filaments and the melt blown fibers is 180° C. or higher.

5. A separation membrane support substrate according to claim 1 or 2, characterized in that the main component of the thermoplastic resin filaments is a polyester fiber or polyester copolymer fiber, or a polyester and polyester copolymer blend fiber.

6. A separation membrane support substrate according to claim 1 or 2, characterized in that the main component of melt blown fibers is a polyester fiber or polyester copolymer fiber, or a polyester and polyester copolymer blend fiber.

7. A separation membrane support substrate according to claim 1 or 2, characterized in that the main component of the thermoplastic resin filaments and melt blown fibers is a polyester fiber or polyester copolymer fiber, or a polyester and polyester copolymer blend fiber.

8. A separation membrane support substrate according to claim 6, characterized in that the melt blown fibers comprise polyethylene terephthalate with a solution viscosity ($\eta sp/c$) of 0.2-0.8.

9. A separation membrane support substrate according to claim 7, characterized in that the melt blown fibers comprise polyethylene terephthalate with a solution viscosity ($\eta sp/c$) of 0.2-0.8.

10. A process for production of a separation membrane support substrate, characterized by satisfying the following conditions (a) to (d);
   (a) a thermoplastic resin filament is spun on a conveyor using a thermoplastic resin with a melting point of 180° C. or higher to form at least one nonwoven fabric layer,
   (b) at least one layer of fibers with a crystallinity of 15-40% and a fiber diameter of no greater than 5 μm, composed of a thermoplastic resin with a melting point of 180° C. or higher, is laminated thereover by a melt blow method,
   (c) at least one layer of nonwoven fabric of thermoplastic resin filaments composed of a thermoplastic resin with a melting point of 180° C. or higher is further laminated, and
   (d) a flat roll is used for heat bonding at a temperature of 50-120° C. below the melting point of the thermoplastic resin filaments, at a line pressure of 100-1000 N/cm, after which calender treatment is carried out at a temperature of at least 10° C. higher than the temperature of said heat bonding and 10-100° C. lower than the melting point of the thermoplastic resin filaments, at a line pressure of 100-1000 N/cm.

11. A process for production of a separation membrane support substrate according to claim 10, characterized in that the thermoplastic resin is a polyester-based resin.

* * * * *